US012732608B2

(12) United States Patent
Li et al.

(10) Patent No.: US 12,732,608 B2
(45) Date of Patent: Sep. 8, 2026

(54) VIDEO CODING PROCESSING METHOD AND DEVICE, AND STORAGE MEDIUM

(71) Applicant: BIGO TECHNOLOGY PTE. LTD., Mapletree Business City (SG)

(72) Inventors: Yihang Li, Beijing (CN); Guisen Xu, Guangzhou (CN)

(73) Assignee: BIGO TECHNOLOGY PTE. LTD., Mapletree Business City (SG)

( * ) Notice: Subject to any disclaimer, the term of this patent is extended or adjusted under 35 U.S.C. 154(b) by 0 days.

(21) Appl. No.: 18/880,016

(22) PCT Filed: Jun. 30, 2023

(86) PCT No.: PCT/CN2023/104698
§ 371 (c)(1),
(2) Date: Dec. 30, 2024

(87) PCT Pub. No.: WO2024/012263
PCT Pub. Date: Jan. 18, 2024

(65) Prior Publication Data

US 2026/0012595 A1 Jan. 8, 2026

(30) Foreign Application Priority Data

Jul. 14, 2022 (CN) ......................... 202210839092.7

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

2020/0252608 A1 8/2020 Ramasubramonian et al.
2020/0296387 A1 9/2020 Mao
(Continued)

FOREIGN PATENT DOCUMENTS

CN 108769696 A 11/2018
CN 110234008 A 9/2019
(Continued)

OTHER PUBLICATIONS

International search report of PCT application No. PCT/CN2023/104698 issued on Sep. 8, 2023.
(Continued)

*Primary Examiner* — James M Anderson, II
(74) *Attorney, Agent, or Firm* — Dilworth & Barrese, LLP

(57) ABSTRACT

Provided is a video coding processing method. The method includes: partitioning a to-be-coded unit into a plurality of to-be-coded sub-blocks; determining residual proportion information of the to-be-coded unit based on residual information of each of the plurality of to-be-coded sub-blocks; determining whether to perform an intra sub-partition check on the to-be-coded unit based on the residual proportion information; and in response to a determination result of not performing the intra sub-partition check on the to-be-coded unit, performing coding processing on the to-be-coded unit based on an adjacent coded unit.

19 Claims, 5 Drawing Sheets

(51) Int. Cl.
*H04N 19/176* (2014.01)
*H04N 19/593* (2014.01)

(56) References Cited

U.S. PATENT DOCUMENTS

2020/0413075 A1* 12/2020 Li .......................... H04N 19/119
2022/0014741 A1* 1/2022 Xiu .......................... H04N 19/46
2022/0182624 A1 6/2022 Cao et al.

FOREIGN PATENT DOCUMENTS

| | | | |
|---|---|---|---|
| CN | 111212292 | A | 5/2020 |
| CN | 111294599 | A | 6/2020 |
| CN | 111669582 | A | 9/2020 |
| CN | 113366837 | A | 9/2021 |
| CN | 114697650 | A | 7/2022 |
| CN | 115379217 | A | 11/2022 |
| JP | 2009153138 | A | 7/2009 |
| KR | 20140098893 | A | 8/2014 |
| WO | 2019127358 | A1 | 7/2019 |
| WO | 2019148906 | A1 | 8/2019 |

OTHER PUBLICATIONS

Zhi Liu et al., Fast ISP coding mode optimization algorithm based on CU texture complexity for VVC, EURASIP Journal on Image and Video Processing, Jul. 2, 2021, abstract, section 3.
China National Intellectual Property Administration, First office action of Chinese application No. 202210839092.7 issued on Aug. 17, 2024, which is foreign counterpart application of this US application.
Benjamin Bross, Versatile Video Coding Editorial Refinements on Draft 10, JVET-T2001-v2, Joint Video Experts Team (JVET) of ITU-T SG 16 WP 3 and ISO/IEC JTC 1/SC 29 20th Meeting, by teleconference, Oct. 7-16, 2020, Nov. 24, 2020, entire document.
Copy of Notice of Reasons for Refusal of Japanese application No. 2024-577322 issued on Oct. 21, 2025.

* cited by examiner

FIG. 3

VIDEO CODING PROCESSING METHOD AND DEVICE, AND STORAGE MEDIUM

This application is U.S. national stage of international application No. PCT/CN2023/104698, filed on Jun. 30, 2023, which claims priority to Chinese Patent Application No. 202210839092.7, filed on Jul. 14, 2022, the disclosures of which are herein incorporated by reference in their entireties.

TECHNICAL FIELD

Embodiments of the present disclosure relate to the field of coding technologies, and in particular, relate to a video coding processing method and device, and a storage medium thereof.

BACKGROUND

When encoding a video image, an intra prediction is usually performed using the intra sub-partition (ISP) technique according to the video coding international standard H.266/VVC. On the basis of the intra prediction of the coding unit defined by the conventional video coding international standard HEVC, the ISP technique partitions the current coding unit into a plurality of horizontal sub-blocks or a plurality of vertical sub-blocks, and sequentially predicts the sub-blocks one by one. Further, the reconstruction value of each sub-block upon prediction is used as a reference for a next sub-block. Therefore, the residual of the sub-block upon prediction is reduced, and higher efficiency for video compression is achieved.

SUMMARY

Embodiments of the present disclosure provide a video coding processing method, a video coding processing device, and a storage medium thereof.

Some embodiments of the present disclosure provide a video coding processing method. The method includes:

- partitioning a to-be-coded unit into a plurality of to-be-coded sub-blocks;
- determining residual proportion information of the to-be-coded unit based on residual information of each of the plurality of to-be-coded sub-blocks;
- determining whether to perform an intra sub-partition check on the to-be-coded unit based on the residual proportion information; and
- in response to a determination result of not performing the intra sub-partition check on the to-be-coded unit, performing coding processing on the to-be-coded unit based on an adjacent coded unit.

Some embodiments of the present disclosure provide a video coding processing device. The device includes: a memory and one or more processors.

The memory is configured to store one or more programs.

The one or more programs, when loaded and run by the one or more processors, cause the one or more processors to perform the video coding processing method according to the above embodiments.

Some embodiments of the present disclosure provide a non-transitory storage medium storing one or more computer-executable instructions, wherein the one or more computer-executable instructions, when loaded and executed by a processor of a computer, cause the computer to perform the video coding processing method according to the above embodiments.

Some embodiments of the present disclosure provide a computer program product including one or more computer programs, wherein the one or more computer programs are stored in a computer-readable storage medium, and the one or more computer programs, when loaded from the computer-readable storage medium and run by at least one processor of a device, cause the device to perform the video coding processing method according to the above embodiments.

BRIEF DESCRIPTION OF DRAWINGS

FIG. 3 is a flowchart of a process for determining a residual information calculation approach according to some embodiments of the present disclosure;

DETAILED DESCRIPTION

In related art, in order to determine an intra sub-partition mode suitable for the current coding unit, each coding unit that goes through the intra sub-partition check needs to be partitioned horizontally and vertically during the intra sub-partition respectively under several intra angle modes with the highest probability in the candidate list of angle modes, and an intra sub-partition mode with a minimum rate distortion cost is screened out for the current coding unit through the rate distortion cost decision. The above processes include a large number of redundant intra sub-partition computations, which greatly increases the complexity of intra prediction and leads to lower efficiency of video coding.

Figure 1:
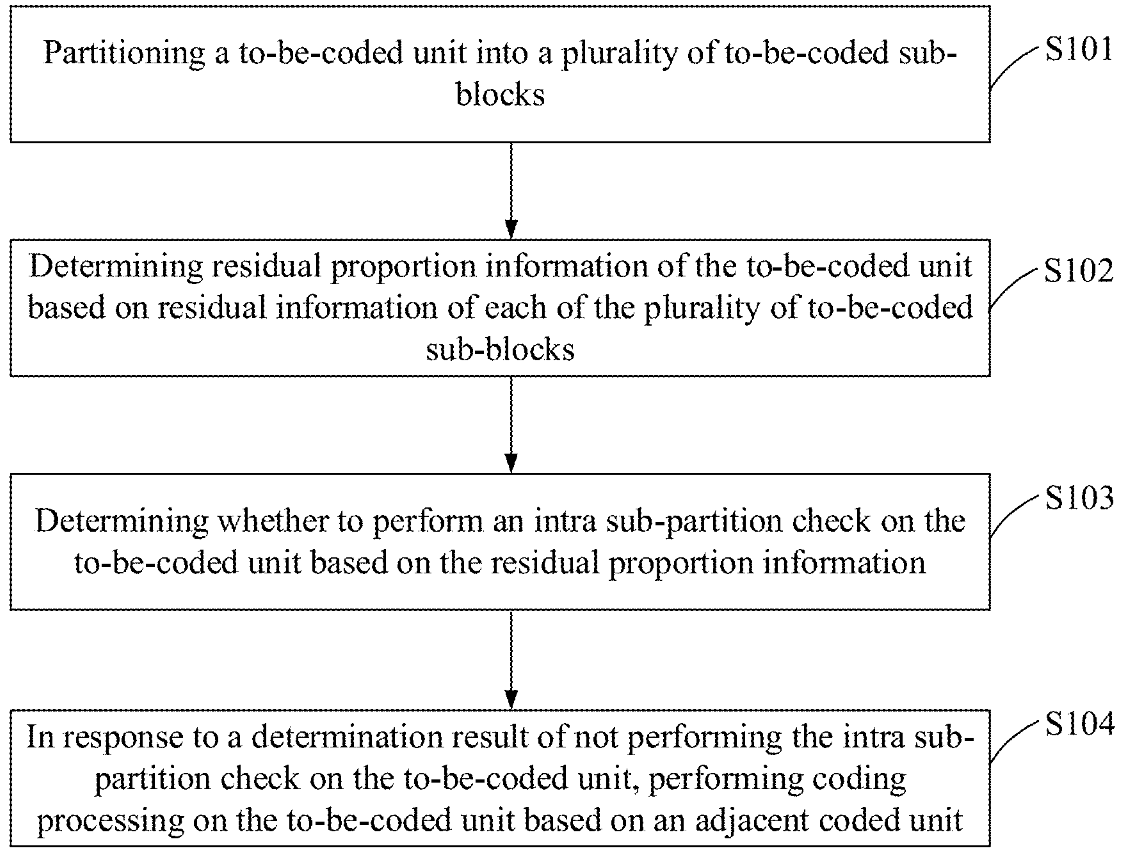
FIG. 1 is a flowchart of a video coding processing method according to some embodiments of the present disclosure.

FIG. 1 is a flowchart of a video coding processing method according to some embodiments of the present disclosure. The method is provided to solve the technical problems in the related art that the computation redundancy of intra sub-partition and the complexity of intra prediction are higher and the video coding efficiency is lower, so as to reduce the complexity of intra prediction and improve the video coding efficiency. In some embodiments, the video coding processing method according to the embodiments of the present disclosure is performed by a video coding processing apparatus. In some embodiments, the video coding processing apparatus is implemented by hardware and/or software and integrated into a video coding processing device.

The following description is given by an example where the video coding processing method is performed by the video coding processing apparatus. Referring to FIG. 1, the video coding processing method includes the following processes.

In S101, a to-be-coded unit is partitioned into a plurality of to-be-coded sub-blocks.

The to-be-coded unit is a coding unit (CU) in a video frame that is to be coded. It is understood that a plurality of coding units are included in the video frame, and coding processing is performed on the plurality of coding units sequentially according to a predetermined sequence (e.g., from left to right, or from top to bottom) based on a predetermined video coding standard (e.g., the video coding international standard H.266/VVC, or the video coding international standard H.265/HEVC) until the coding for the current to-be-coded video frame is completed.

In related art, to achieve higher efficiency of image compression, the intra sub-partition (ISP) technique is usually used to code the coding unit according to the video coding international standard H.266/VVC. ISP technique is an intra prediction technique in the newest generation of video coding international standard H.266/VVC. On the basis of the conventional intra prediction of coding units, the ISP technique partitions the current coding unit into multiple horizontal sub-blocks or into multiple vertical sub-blocks, and determines the reconstruction values of the sub-blocks by sequentially predicting the sub-blocks one by one. The reconstructed value of each sub-block is used as a reference for a next sub-block, so as to reduce the residual of each sub-block upon prediction to achieve higher efficiency of compression.

The intra sub-partition algorithm is implemented upon the angle prediction of the to-be-coded unit being completed. That is, in the case that a candidate list of angle modes for intra prediction of the to-be-coded unit is determined, the intra sub-partition algorithm partitions the coding unit into two or four sub-blocks in the same direction, and performs prediction for each sub-block by sequentially selecting the top few angle modes of the candidate list of angle modes. In the process of intra sub-partition prediction, the top few modes of the candidate list of angle modes for the current to-be-coded unit are traversed. During an intra sub-partition check process, each sub-block uses the same intra angle mode, and the reconstructed pixel of each sub-block is used as a reference pixel of the next sub-block, which shortens the distance between each sub-block and the reference pixel and makes the pixels in the sub-block and the reference pixel more relevant, thereby reducing the prediction residual and improving the compression efficiency. However, to select a suitable intra sub-partition mode for the current to-be-coded unit, each to-be-coded unit that goes through the intra sub-partition check needs to be intra partitioned horizontally and vertically respectively under several intra angle modes with the highest probability in the candidate list of angle modes, and an intra sub-partition mode with a smallest rate distortion cost is filtered out for the current to-be-coded unit based on the rate distortion cost decision. However, the above sub-partition check process greatly increases the intra prediction complexity and limits the video coding efficiency. To solve the above technical problems, the present disclosure partitions the to-be-coded unit into multiple to-be-coded sub-blocks according to the possible division modes of the intra sub-partition technique prior to performing the intra sub-partition check on the to-be-coded unit, and determines whether the current to-be-coded unit needs to be subjected to the intra sub-partition check based on the residual proportion information of the to-be-coded sub-blocks. That is, it is not necessary to perform the intra sub-partition check on all of the to-be-coded units, and some redundant intra sub-partition check processes are avoided, thereby improving the video coding efficiency. Specifically, whether the current to-be-coded unit is suitable for the intra sub-partition check is determined based on the distribution of the residuals of the current to-be-coded unit upon the angle prediction among the to-be-coded sub-blocks, so as to skip the redundant intra sub-partition computation and achieve the acceleration of the video coding.

In some embodiments, for each to-be-coded unit that needs to be coded, the to-be-coded unit is partitioned into a plurality of to-be-coded sub-blocks upon a candidate list of angle modes for intra prediction of the to-be-coded unit being determined. In some embodiments, the to-be-coded unit is partitioned into two or four to-be-coded sub-blocks according to possible divisions of the intra sub-partition technique.

In some embodiments, the number of to-be-coded sub-blocks acquired by partitioning is determined based on the size of the to-be-coded unit. In some embodiments, in the case that the unit size of the to-be-coded unit is within a first size range (e.g., 4*8 or 8*4), the to-be-coded unit is partitioned into a first number (e.g., 2) of to-be-coded sub-blocks; in the case that the unit size of the to-be-coded unit is within a second size range (e.g., greater than 4*8 or greater than 8*4), the to-be-coded unit is partitioned into a second number (e.g., 4) of to-be-coded sub-blocks, wherein the second size range corresponds to a size larger than a size corresponding to the first size range; and in the case that the unit size of the to-be-coded unit is within a third size range (e.g., 4*4), the to-be-coded unit is not partitioned, wherein the size corresponding to the first size range is larger than a size corresponding to the third size range, and the size corresponding to the third size range is the smallest coding size for video coding.

In some embodiments, for a to-be-coded unit with a unit size of 4*4, because the minimum coding size defined by the video coding international standard H.266/VVC is 4*4, and the intra sub-partition technique requires the sub-block size to be at least 16 pixels, the 4*4 to-be-coded unit needs to be predicted as a whole, e.g., the intra prediction for the 4*4 to-be-coded unit is performed using an adjacent coded unit, and the subsequent process of determining whether to perform the intra sub-partition check is not necessary. For a to-be-coded unit with a unit size of 4*8 or 8*4, the to-be-coded unit is partitioned into two to-be-coded sub-blocks; and for a to-be-coded unit with a unit size greater than 4*8 or greater than 8*4, the to-be-coded unit is partitioned into four to-be-coded sub-blocks.

In S102, residual proportion information of the to-be-coded unit is determined based on residual information of each to-be-coded sub-block.

In some embodiments, in the case that the plurality of to-be-coded sub-blocks of the to-be-coded unit are acquired, residual information corresponding to each to-be-coded sub-block is determined, and the residual proportion information of the to-be-coded unit is determined based on the residual information of each to-be-coded sub-block. In some embodiments, the residual information represents a residual difference between the predicted value of the to-be-coded sub-block and the original pixel value, which represents a correlation between the to-be-coded sub-block and the reference pixel, i.e., the residual information characterizes an amount of information of the residual of the to-be-coded sub-block. Generally, the stronger the correlation between the to-be-coded sub-block and the reference pixel, the smaller the residual difference between the predicted value of the to-be-coded sub-block and the original pixel value.

In some embodiments, the residual information of the to-be-coded sub-block is represented by information that characterizes the distortion degree of the to-be-coded unit upon prediction, such as a Hadamard transformation score (HAD), a sum of absolute difference (SAD), a mean squared error (MSE), a sum of squared difference (SSD), a rate distortion cost (RD-Cost), or a combination of one or more of the above. In some embodiments, the residual proportion information of the to-be-coded unit is represented by the distribution of the residual information of the to-be-coded sub-blocks among the to-be-coded unit. In some embodiments, the residual proportion information is a proportion of the largest residual information in the residual information of these to-be-coded sub-blocks.

In S103, whether to perform an intra sub-partition check on the to-be-coded unit is determined based on the residual proportion information.

In some embodiments, in the case that the residual proportion information of the to-be-coded unit is determined, whether to perform the intra sub-partition check on the current to-be-coded unit is determined based on the residual proportion information. In some embodiments, in the case that the residual proportion information indicates that the correlation between a specific portion of pixels within the to-be-coded unit and a reference pixel within an adjacent coded unit does not reach a predetermined intensity, it is determined that an intra sub-partition check needs to be performed on the to-be-coded unit, and an intra prediction mode for the to-be-coded unit is determined based on the intra sub-partition check result, so as to reduce the rate distortion cost during the coding process and increase the compression rate of the video coding. In the case that the residual proportion information indicates that the correlations between the pixels within the to-be-coded unit and the reference pixels within the adjacent coded unit all reach a predetermined intensity, the intra sub-partition check for the current to-be-coded unit is omitted, so as to avoid the redundant intra sub-partition check process and improve the video coding efficiency.

In S104, in response to a determination result of not performing the intra sub-partition check on the to-be-coded unit, coding processing is performed on the to-be-coded unit based on an adjacent coded unit.

In some embodiments, in the case that it is determined that the intra sub-partition check is not necessary for the to-be-coded unit, the pixels within the current to-be-coded unit are considered to have a strong correlation with reference pixels within an adjacent coded unit, the intra sub-partition check for the current to-be-coded unit is omitted, and coding processing is directly performed on the to-be-coded unit based on the adjacent coded unit, which significantly improves the coding speed of the intra prediction of the to-be-coded unit during the video coding process.

In some embodiments, during the process of determining whether to perform the intra sub-partition check on the to-be-coded unit based on the residual proportion information, in the case that it is determined that the intra sub-partition check is necessary for the to-be-coded unit, coding processing is performed on the to-be-coded unit based on the whole intra sub-partition technique. Based on the above, upon determining whether to perform the intra sub-partition check on the to-be-coded unit based on the residual proportion information, the present embodiment further includes: in response to a determination result of performing the intra sub-partition check on the coding unit, performing coding processing on the to-be-coded unit based on the intra sub-partition technique.

In some embodiments, in the case that it is determined that the intra sub-partition check is necessary for the to-be-coded unit, the pixels within the current to-be-coded unit are considered to have weak correlations with the reference pixels within the adjacent coded unit, and coding processing needs to be performed on the to-be-coded unit using the intra sub-partition technique. That is, the intra sub-partition check for the to-be-coded unit is performed horizontally and/or vertically, and the optimal intra prediction mode is selected based on the rate distortion cost decision for performing and processing on the to-be-coded unit.

In some embodiments, performing coding processing on the to-be-coded unit using the intra sub-partition technique includes: determining an intra sub-partition check result for the to-be-coded unit; and determining an intra prediction mode for the to-be-coded unit based on the intra sub-partition check result, and performing coding processing on the to-be-coded unit in the intra prediction mode.

In some embodiments, in the case that it is determined that the intra sub-partition check is necessary for the to-be-coded unit, intra sub-partition check results for the to-be-coded unit in the horizontal direction and the vertical direction are determined, and a rate distortion cost for coding based on the horizontal intra sub-partition, a rate distortion cost for coding based on the vertical intra sub-partition, and a rate distortion cost for coding by taking the to-be-coded unit as a whole are calculated based on the intra sub-partition check results. Further, the intra prediction mode corresponding to a minimum rate distortion cost is taken as the intra prediction mode of the current to-be-coded unit, and coding processing is performed on the to-be-coded unit in the intra prediction mode. That is, taking the to-be-coded sub-block as a unit, the top few angle modes in the candidate list of angle modes are sequentially selected for prediction. Each to-be-coded unit that goes through the intra sub-partition check needs to be intra partitioned horizontally and vertically respectively under several intra angle modes with the highest probability in the candidate list of angle modes, and an intra prediction mode with the lowest rate distortion cost for the current to-be-coded unit is filtered out, based on a rate distortion cost decision, for performing coding processing on the current to-be-coded unit from the coding based on the horizontal intra sub-partition, the coding based on the vertical intra sub-partition, and the coding by taking the to-be-coded unit as a whole.

In some embodiments of the present disclosure, determining the intra prediction mode for the to-be-coded unit based on the intra sub-partition check result includes:

in a case that the intra sub-partition check result satisfies an intra sub-partition processing condition, determining the intra prediction mode for the to-be-coded unit as performing coding processing on the to-be-coded unit using the intra sub-partition technique; and in a case that the intra sub-partition check result does not satisfy the intra sub-partition processing condition, determining the intra prediction mode for the to-be-coded unit as performing coding processing on the to-be-coded unit based on an adjacent coded unit.

In some embodiments, in the case that the intra sub-partition check result for the to-be-coded unit is acquired, whether the intra sub-partition check result satisfies the intra sub-partition processing condition is determined. In some embodiments, determining whether the intra sub-partition check result satisfies the intra sub-partition processing condition includes: based on the intra sub-partition check result, calculating a first rate distortion cost for coding based on the horizontal intra sub-partition, a second rate distortion cost for coding based on the vertical intra sub-partition, and a third rate distortion cost for coding by taking the to-be-coded unit as a whole coding unit; in the case that at least one of the first rate distortion cost or the second rate distortion cost is less than the third rate distortion cost, determining that the intra sub-partition check result satisfies the intra sub-partition processing condition; and in the case that both the first rate distortion cost and the second rate distortion cost are greater than or equal to the third rate distortion cost, determining that the intra sub-partition check result does not satisfy the intra sub-partition processing condition.

In the case that the intra sub-partition check result satisfies the intra sub-partition processing condition, the intra prediction mode for the to-be-coded unit is determined to be performing coding processing on the to-be-coded unit using the intra sub-partition technique, i.e., the to-be-coded unit is partitioned into a plurality of sub-blocks (the to-be-coded sub-blocks) along the direction corresponding to the smallest rate distortion cost, and coding processing is performed on the to-be-coded unit by taking the adjacent coded sub-blocks or the adjacent coded units as references and taking the sub-block as a unit. In the case that the intra sub-partition check result does not satisfy the intra sub-partition processing condition, it is determined that the intra prediction mode for the to-be-coded unit is performing coding processing on the to-be-coded unit based on an adjacent coded unit, i.e., coding processing is performed on the to-be-coded unit by taking the adjacent coded unit as a reference and taking the entire to-be-coded unit as a unit.

As described above, a to-be-coded unit is partitioned into a plurality of to-be-coded sub-blocks, residual proportion information for each to-be-coded sub-block is determined, whether to perform the intra sub-partition check on the to-be-coded unit is determined based on the residual proportion information, and in the case that it is determined the intra sub-partition check is not necessary for the to-be-coded unit, coding processing is performed on the current to-be-coded unit based on an adjacent coded unit. In this way, the redundant intra sub-partition check process is avoided, thereby effectively reducing the complexity of intra prediction and improving the efficiency of video coding. Moreover, in the case that it is determined that the intra sub-partition check is necessary for the to-be-coded unit, the intra prediction mode for the to-be-coded unit is determined based on the intra sub-partition check result, which effectively improves the video compression effect. During an intra sub-partition check process, each sub-block uses the same intra angle mode, and the reconstructed pixel of each sub-block is used as a reference pixel of the next sub-block, which shortens the distance between each sub-block and the reference pixel and makes the pixels within the sub-block and the reference pixel more relevant, thereby effectively reducing the intra prediction residual and improving the coding and compression efficiency of videos.

Figure 2:
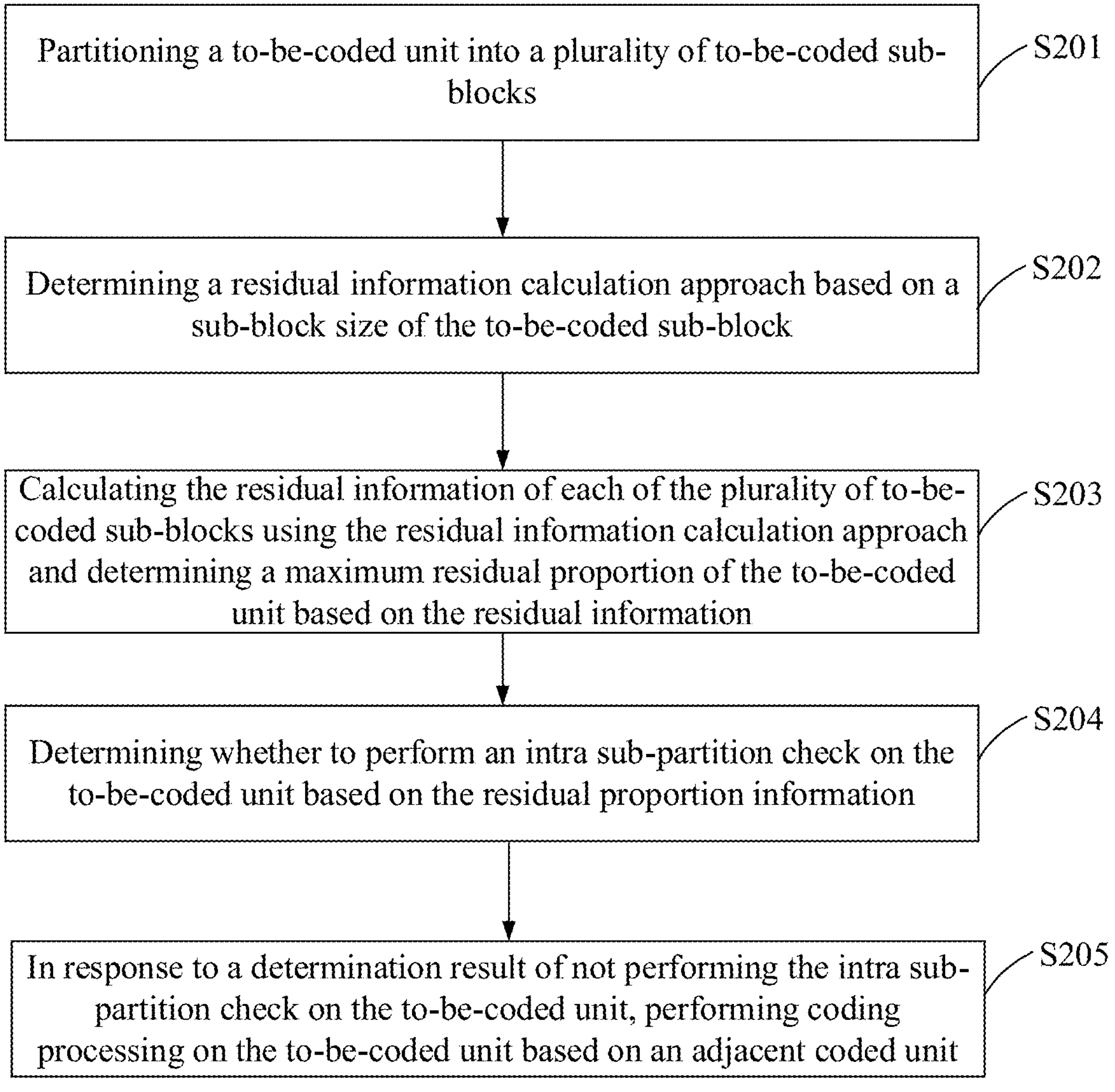
FIG. 2 is a flowchart of another video coding processing method according to some embodiments of the present disclosure.

On the basis of the above embodiments, FIG. 2 shows a flowchart of another video coding processing method according to some embodiments of the present disclosure. The video coding processing method is a particularization of the above video coding processing method.

Referring to FIG. 2, the video coding processing method includes the following processes.

In S201, a to-be-coded unit is partitioned into a plurality of to-be-coded sub-blocks.

In S202, a residual information calculation approach is determined based on a sub-block size of the to-be-coded sub-block.

In some embodiments, in the case that the to-be-coded unit is partitioned into the plurality of to-be-coded sub-blocks, a residual information calculation approach for each to-be-coded sub-block is determined based on a sub-block size of the to-be-coded sub-block, wherein different sub-block sizes correspond to different residual calculation approaches. In some embodiments, the residual information calculation approach includes calculating a Hadamard transformation score, a sum of absolute difference, a mean squared error, a sum of squared difference, a rate distortion cost of the to-be-coded sub-block, or a combination of one or more of the above parameters. The present embodiments are described by taking that the residual information is represented by the Hadamard transformation score as well as the sum of absolute difference as an example.

Figure 3:
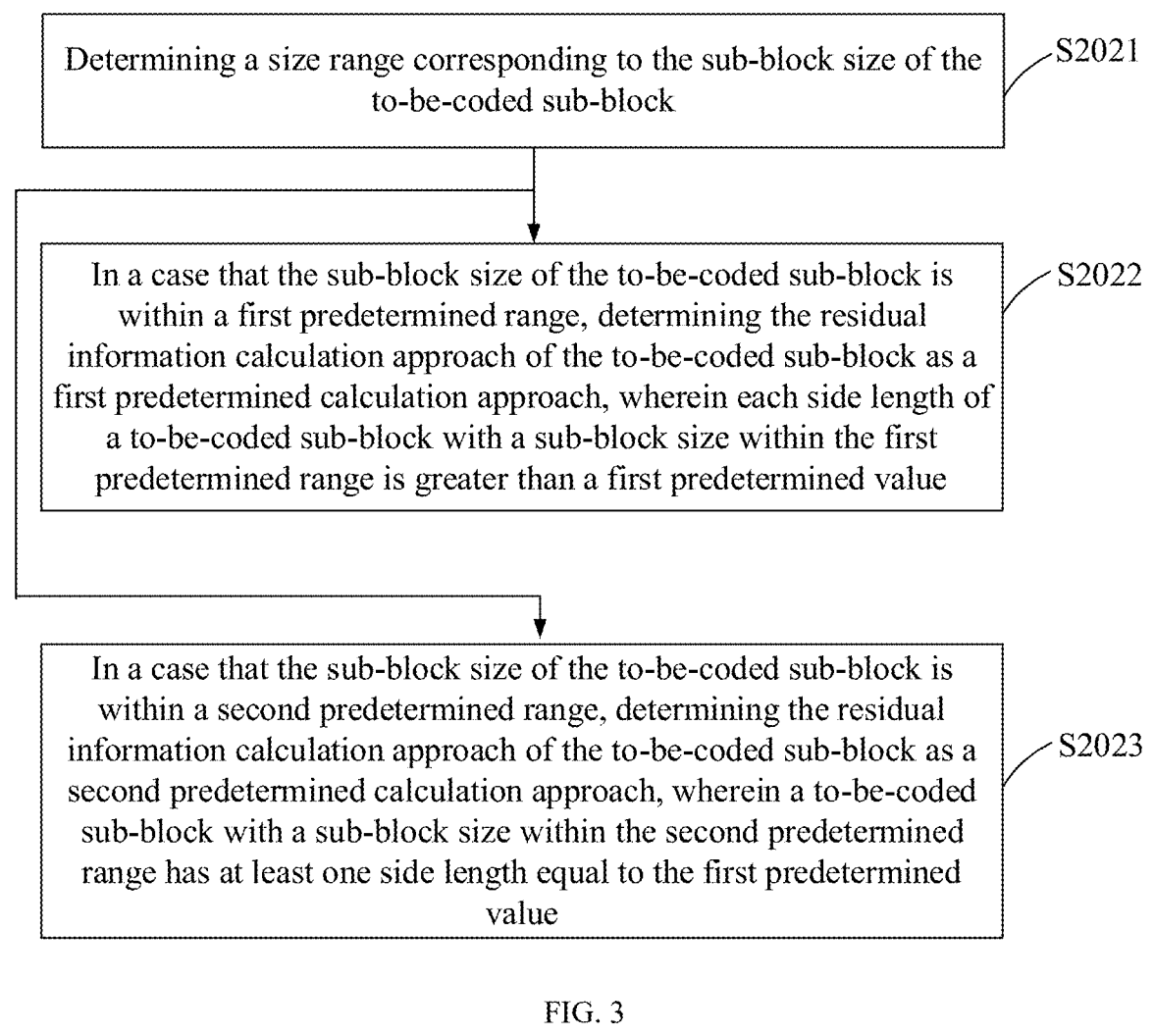

In some embodiments, because the residual transformation is necessary during the final coding processing on the to-be-coded unit or the to-be-coded sub-block, the residual information is preferentially calculated using a residual information calculation approach that takes the residual transformation into account to improve the efficiency of video coding. Based on this, referring to a flowchart of a residual information calculation approach determination illustrated in FIG. 3, in the present disclosure, determining the residual information calculation approach based on the sub-block size of the to-be-coded sub-block includes the following processes.

In S2021, a size range corresponding to the sub-block size of the to-be-coded sub-block is determined.

In S2022, in the case that the sub-block size of the to-be-coded sub-block is within a first predetermined range, the residual information calculation approach of the to-be-coded sub-block is determined as a first predetermined calculation approach, wherein each side length of a to-be-coded sub-block with a sub-block size within the first predetermined range is greater than a first predetermined value.

In S2023, in the case that the sub-block size of the to-be-coded sub-block is within a second predetermined range, the residual information calculation approach of the to-be-coded sub-block is determined as a second predetermined calculation approach, wherein a to-be-coded sub-block with a sub-block size within the second predetermined range has at least one side length equal to the first predetermined value.

In some embodiments, in the case that the to-be-coded unit is partitioned into a plurality of to-be-coded sub-blocks, sub-block sizes corresponding to the to-be-coded sub-blocks (which have the same sizes) are determined, and size ranges corresponding to the sub-block sizes of the to-be-coded sub-blocks are determined. The size range provided by the present disclosure includes a first predetermined range and a second predetermined range, wherein each side length of a to-be-coded sub-block with a sub-block size within the first predetermined range is greater than a first predetermined value, and a to-be-coded sub-block with a sub-block size within the second predetermined range has at least one side length equal to the first predetermined value. In some embodiments, the first predetermined value is 1, then the size range corresponding to the first predetermined range is not 1*N or N*1, wherein N is greater than or equal to 8; and the size range corresponding to the second predetermined range is 1*N or N*1. That is, in the case that the to-be-coded sub-block includes a side length equal to the first predetermined value (e.g., 1), the sub-block size of the to-be-coded sub-block is in the second predetermined range; and in the case that all side lengths of the to-be-coded sub-block are greater than the first predetermined value, the sub-block size of the to-be-coded sub-block is within the first predetermined range.

In the case that the sub-block size of the to-be-coded sub-block is determined within the first predetermined range, the residual information calculation approach of the to-be-coded sub-block is determined as the first predetermined calculation approach. In the case that the sub-block size of the to-be-coded sub-block is determined within the second predetermined range, the residual information calculation approach of the to-be-coded sub-block is determined as the second predetermined calculation approach. The first predetermined calculation approach is to calculate a Hadamard transformation score of the to-be-coded sub-block, and the second predetermined calculation approach is to calculate a sum of absolute difference (or one of a mean squared error, a sum of squared difference, and a rate distortion cost) of the to-be-coded sub-block. It is to be explained that because the calculation process of the Hadamard transformation score takes into account the effect of the residual transformation to a certain extent, the Hadamard transformation score better represents the value of the residual upon transformation and quantification, which helps to more accurately determine whether to skip the intra sub-partition check, so as to improve the efficiency of the video coding.

In S203, residual information of each to-be-coded sub-block is calculated using the residual information calculation approach, and a maximum residual proportion of the to-be-coded unit is determined based on the residual information.

The present disclosure uses the maximum residual proportion corresponding to the residual information to represent the residual proportion information of the to-be-coded unit, and therefore, the correlation between the pixels within the current to-be-coded unit and the adjacent coded unit is more intuitively and effectively reflected.

In some embodiments, in the case that the residual information calculation approach of the to-be-coded sub-block is determined, residual information of each to-be-coded sub-block is calculated using the determined residual information calculation approach, and the maximum residual proportion of the current to-be-coded unit is calculated based on the residual information of these to-be-coded sub-blocks. That is, the largest residual information among the residual information of these to-be-coded sub-blocks is calculated, and a proportion of the maximum residual information in all residual information is calculated, such that the maximum residual proportion of the to-be-coded unit is acquired.

In some embodiments, when calculating the maximum residual proportion of the to-be-coded unit, the calculation is performed based on different residual information. Based on this, in some embodiments, calculating the residual information of each of the plurality of to-be-coded sub-blocks using the residual information calculation approach and determining the maximum residual proportion of the to-be-coded unit based on the residual information includes: in the case that the residual information calculation approach is the first predetermined calculation approach, calculating a Hadamard transformation score of each to-be-coded sub-block and determining the maximum residual proportion of the to-be-coded unit based on a proportion of a maximum Hadamard transformation score in the Hadamard transformation scores; and in the case that the residual information calculation approach is the second predetermined calculation approach, calculating a sum of absolute difference of each to-be-coded sub-block and determining the maximum residual proportion of the to-be-coded unit based on a proportion of a maximum sum of absolute difference in the sums of absolute difference.

In some embodiments, in the case that the residual information calculation approach is the first predetermined calculation approach (i.e., calculating the Hadamard transformation score of the to-be-coded sub-block) the Hadamard transformation score of each to-be-coded sub-block is calculated. A maximum Hadamard transformation score among these Hadamard transformation scores is determined, a proportion of the maximum Hadamard transformation score in these Hadamard transformation scores is calculated, and the proportion of the maximum Hadamard transformation score in these Hadamard transformation scores is determined as the maximum residual proportion of the current to-be-coded unit.

In the case that the residual information calculation approach is the first predetermined calculation approach (at this time, the sub-block size of the to-be-coded sub-block is within the first predetermined range, e.g., the sub-block size of the to-be-coded sub-block is not 1*N or N*1), taking that the to-be-coded unit is partitioned into four to-be-coded sub-blocks as an example, the maximum residual proportion of the to-be-coded unit is:

$$\omega = \frac{\max(HAD_0, HAD_1, HAD_2, HAD_3)}{HAD_0 + HAD_1 + HAD_2 + HAD_3}$$

wherein $HAD_0, \ldots, HAD_3$ are the Hadamard transformation scores respectively corresponding to the four to-be-coded sub-blocks.

In the case that the residual information calculation approach is the second predetermined calculation approach (i.e., calculating the sum of absolute difference of the to-be-coded sub-block), the sum of absolute difference of each to-be-coded sub-block is calculated. A maximum sum of absolute difference among these sums of absolute difference is determined, a proportion of the maximum sum of absolute difference in these sums of absolute difference is calculated, and the proportion of the maximum sum of absolute difference in these sums of absolute difference is determined as the maximum residual proportion of the current to-be-coded unit.

In the case that the residual information calculation approach is the second predetermined calculation approach (at this time, the sub-block size of the to-be-coded sub-block is within the second predetermined range, e.g., the sub-block size of the to-be-coded sub-block is 1*N or N*1), taking that the to-be-coded unit is partitioned into four to-be-coded sub-blocks as an example, the maximum residual proportion of the to-be-coded unit is $$\omega = \frac{\max(SAD_0, SAD_1, SAD_2, SAD_3)}{SAD_0 + SAD_1 + SAD_2 + SAD_3}$$

wherein $SAD_0, \ldots, SAD_3$ are the sums of absolute difference respectively corresponding to the four to-be-coded sub-blocks.

In S204, whether to perform an intra sub-partition check on the to-be-coded unit is determined based on the residual proportion information.

Figure 4:
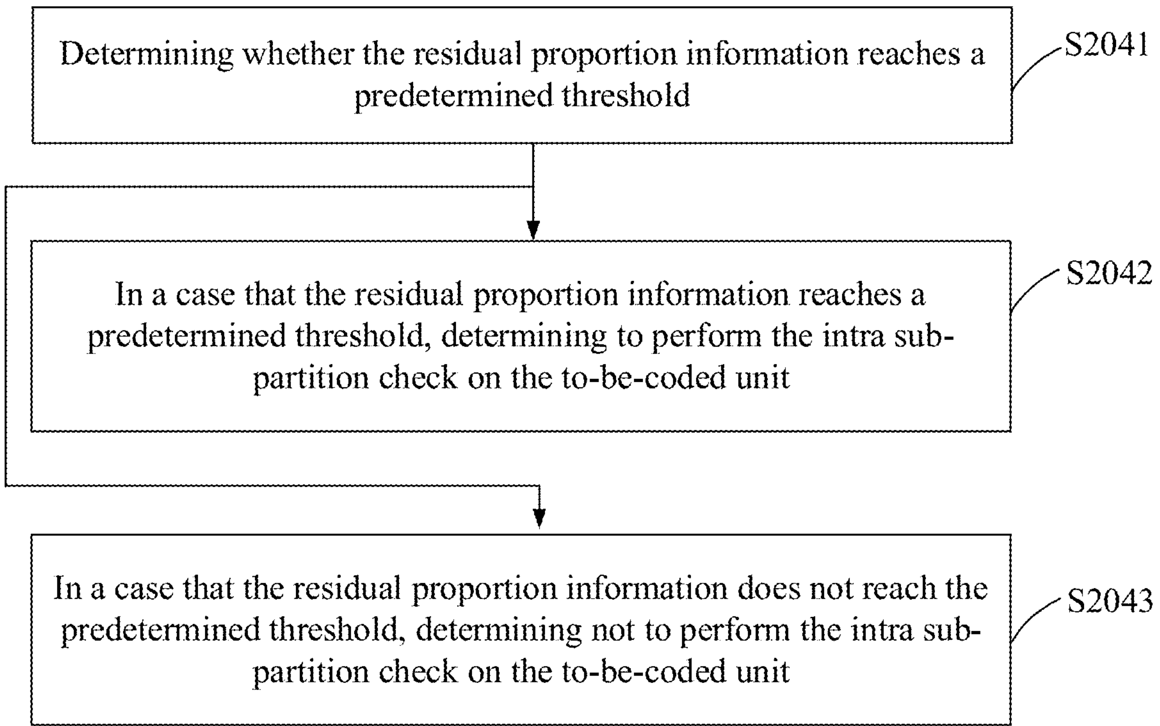
FIG. 4 is a flowchart of an intra sub-partition check determination process according to some embodiments of the present disclosure.

In some embodiments, in the case that the residual proportion information of the to-be-coded unit is determined, whether to skip the intra sub-partition check for the to-be-coded unit is further determined based on the residual proportion information, wherein the determination of whether to skip the intra sub-partition check is implemented based on a comparative result between the residual proportion information and a predetermined threshold. Based on this, referring to the flowchart of an intra sub-partition check determination as illustrated in FIG. 4, in the present disclosure, determining whether to perform the intra sub-partition check on the to-be-coded unit based on the residual proportion information includes the following processes.

In S2041, whether the residual proportion information reaches a predetermined threshold is determined.

In S2042, in the case that the residual proportion information reaches the predetermined threshold, it is determined to perform the intra sub-partition check on the to-be-coded unit.

In S2043, in the case that the residual proportion information does not reach the predetermined threshold, it is determined not to perform the intra sub-partition check on the to-be-coded unit.

In some embodiments, in the case that the maximum residual proportion of the to-be-coded unit is determined, whether the maximum residual proportion reaches the predetermined threshold is determined by comparing the maximum residual proportion with the predetermined threshold. In the case that the maximum residual proportion of the current to-be-coded unit reaches the predetermined threshold, it is considered that an intra sub-partition mode is likely to be selected as the optimal mode for performing coding processing on the current to-be-coded unit upon the intra sub-partition check being performed. In the case that the maximum residual proportion of the current to-be-coded unit does not reach the predetermined threshold, it is considered that the intra sub-partition mode is unlikely to be selected as the optimal mode for performing coding processing on the current to-be-coded unit upon the intra sub-partition check being performed, and thus it is determined that the intra sub-partition check is not necessary for the current to-be-coded unit, so as to reduce the redundant intra sub-partition check process.

In some embodiments, the residual information in the present disclosure includes first residual information in a first direction (e.g., horizontal) of the to-be-coded sub-block and second residual information in a second direction (e.g., vertical) of the to-be-coded sub-block. Correspondingly, the residual proportion information (maximum residual proportion) in the present disclosure includes the first residual proportion information in the first direction of the to-be-coded sub-block and the second residual proportion information in the second direction of the to-be-coded sub-block. Therein, the calculation of the residual information and the residual proportion information in each direction is similar to the calculation of the residual information described above, which is not repeated in this embodiment. Correspondingly, the residual proportion information (maximum residual proportion) respectively in the first direction and the second direction is calculated, and the residual proportion information is compared with a predetermined threshold of a corresponding direction. In the case that there exists one direction in which the residual proportion information reaches the predetermined threshold, it is considered that the intra sub-partition mode is likely to be selected as the optimal mode for performing coding processing on the current to-be-coded unit upon an intra sub-partition check in the corresponding direction being performed, and it is determined that an intra sub-partition check in the corresponding direction is necessary for the to-be-coded unit. In the case that the residual proportion information in both directions does not reach the predetermined threshold, it is considered that the intra sub-partition mode is unlikely to be selected as the optimal mode for performing coding processing on the current to-be-coded unit upon the intra sub-partition checks in both two directions being performed, and it is determined that the intra sub-partition checks in the corresponding directions are not necessary for the to-be-coded unit.

In S205, in response to a determination result of not performing the intra sub-partition check on the to-be-coded unit, coding processing is performed on the to-be-coded unit based on an adjacent coded unit.

As described above, a to-be-coded unit is partitioned into a plurality of to-be-coded sub-blocks, residual proportion information for each to-be-coded sub-block is determined, whether to perform the intra sub-partition check on the to-be-coded unit is determined based on the residual proportion information, and in the case that it is determined the intra sub-partition check is not necessary for the to-be-coded unit, coding processing is performed on the current to-be-coded unit based on an adjacent coded unit. In this way, the redundant intra sub-partition check process is avoided, thereby effectively reducing the complexity of intra prediction and improving the efficiency of video coding. At the same time, the Hadamard transformation score, which takes into account the effect of the transformation, is used as a standard for measuring the distribution of the residuals. The Hadamard transformation score better represents the value of the residual upon transformation and quantification, and helps to achieve more accurate intra sub-partition skipping determination. The consistency of the video quality upon coding is ensured. The data required for calculating the residual information is from the conventional intra calculation process of the to-be-coded unit. Therefore, the memory usage is lower and the high efficiency of the video coding is ensured. Further, the coding speed of the encoder is improved under the prerequisite of reducing the impact on the objective performance of the encoder and ensuring the consistency of subjective picture quality. Therefore, the utilization rate of the server-end computational resources is improved, the server cost is reduced, the utilization rate of the client-end processor resources is reduced, and the user experience is effectively improved.

Figure 5:
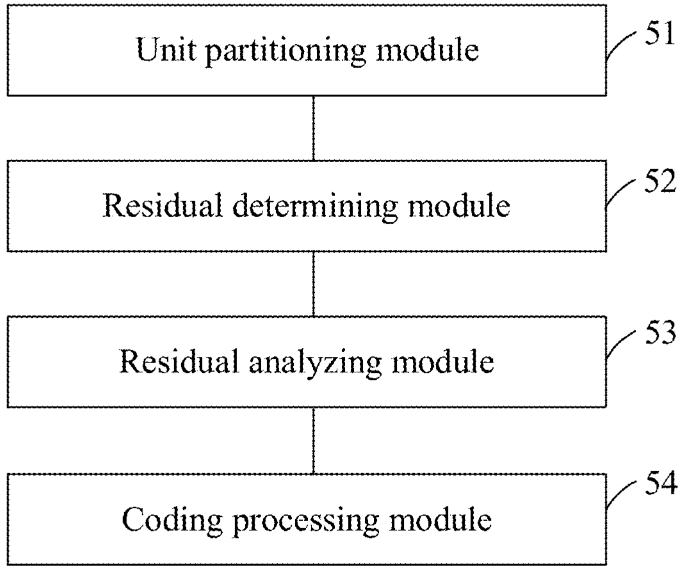
FIG. 5 is a schematic structural diagram of a video coding processing apparatus according to some embodiments of the present disclosure.

FIG. 5 is a schematic structural diagram of a video coding processing apparatus according to some embodiments of the present disclosure. Referring to FIG. 5, the video coding processing apparatus includes a unit partitioning module 51, a residual determining module 52, a residual analyzing module 53, and a coding processing module 54.

The unit partitioning module 51 is configured to partition a to-be-coded unit into a plurality of to-be-coded sub-blocks; the residual determining module 52 is configured to determine residual proportion information of the to-be-coded unit based on residual information of each of the plurality of to-be-coded sub-blocks; the residual analyzing module 53 is configured to determine whether to perform an intra sub-partition check on the to-be-coded unit based on the residual proportion information; and the coding processing module 54 is configured to perform coding processing on the to-be-coded unit based on an adjacent coded unit in response to a determination result of not performing the intra sub-partition check on the to-be-coded unit.

As described above, a to-be-coded unit is partitioned into a plurality of to-be-coded sub-blocks, residual proportion information for each to-be-coded sub-block is determined, whether to perform the intra sub-partition check on the to-be-coded unit is determined based on the residual proportion information, and in the case that it is determined the intra sub-partition check is not necessary for the to-be-coded unit, coding processing is performed on the current to-becoded unit based on an adjacent coded unit. In this way, the redundant intra sub-partition check process is avoided, thereby effectively reducing the complexity of intra prediction and improving the efficiency of video coding.

On the basis of the above embodiment, the residual information comprises first residual information in a first direction of the to-be-coded sub-block and second residual information in a second direction of the to-be-coded sub-block.

On the basis of the above embodiment, the residual determining module 52 is configured to:

determine a residual information calculation approach based on a sub-block size of the to-be-coded sub-block; and calculate the residual information of each to-be-coded sub-block using the residual information calculation approach and determine a maximum residual proportion of the to-be-coded unit based on the residual information.

On the basis of the above embodiment, the residual determining module 52, when determining the residual information calculation approach based on the sub-block size of the to-be-coded sub-block, is configured to:

in a case that the sub-block size of the to-be-coded sub-block is within a first predetermined range, determining the residual information calculation approach of the to-be-coded sub-block as a first predetermined calculation approach, wherein each side length of a to-be-coded sub-block with a sub-block size within the first predetermined range is greater than a first predetermined value; and in a case that the sub-block size of the to-be-coded sub-block is within a second predetermined range, determining the residual information calculation approach of the to-be-coded sub-block as a second predetermined calculation approach, wherein a to-be-coded sub-block with a sub-block size within the second predetermined range has at least one side length equal to the first predetermined value.

On the basis of the above embodiment, the residual determining module 52, when calculating the residual information of each of the plurality of to-be-coded sub-blocks using the residual information calculation approach and determining the maximum residual proportion of the to-be-coded unit based on the residual information, is configured to:

in the case that the residual information calculation approach is the first predetermined calculation approach, calculate a Hadamard transformation score of each to-be-coded sub-block and determine a maximum residual proportion of the to-be-coded unit based on a proportion of a maximum Hadamard transformation score in the Hadamard transformation scores; and in the case that the residual information calculation approach is the second predetermined calculation approach, calculate a sum of absolute difference of each to-be-coded sub-block and determine the maximum residual proportion of the to-be-coded unit based on a proportion of a maximum sum of absolute difference in the sums of absolute difference.

On the basis of the above embodiment, the residual analyzing module 53 is configured to:

in a case that the residual proportion information reaches a predetermined threshold, determine to perform the intra sub-partition check on the to-be-coded unit; and in a case that the residual proportion information does not reach the predetermined threshold, determine not to perform the intra sub-partition check on the to-be-coded unit.

On the basis of the above-described embodiment, the coding processing module 54 is further configured to: in response to a determination result of performing the intra sub-partition check on the to-be-coded unit, perform coding processing on the to-be-coded unit using an intra sub-partition technique.

On the basis of the above embodiment, the coding processing module 54, when performing coding processing on the to-be-coded unit using the intra sub-partition technique, is configured to:

determine an intra sub-partition check result for the to-be-coded unit; and determine an intra prediction mode for the to-be-coded unit based on the intra sub-partition check result, and perform coding processing on the to-be-coded unit in the intra prediction mode.

On the basis of the above embodiment, the coding processing module 54, when determining the intra prediction mode for the to-be-coded unit based on the intra sub-partition check result, is configured to:

in a case that the intra sub-partition check result satisfies an intra sub-partition processing condition, determine the intra prediction mode for the to-be-coded unit as performing coding processing on the to-be-coded unit using the intra sub-partition technique; and in a case that the intra sub-partition check result does not satisfy the intra sub-partition processing condition, determine the intra prediction mode for the to-be-coded unit as performing coding processing on the to-be-coded unit based on an adjacent coded unit.

It is to be noted that, in the above embodiments of the video coding processing apparatus, the various units and modules included are only defined based on functional logic, but the apparatus is not limited to the above division, as long as the corresponding functions can be achieved. Furthermore, the specific names of the functional units are only for the purpose of differentiation from each other, but are not used to limit the protection scope of the embodiments of the present disclosure.

Figure 6:
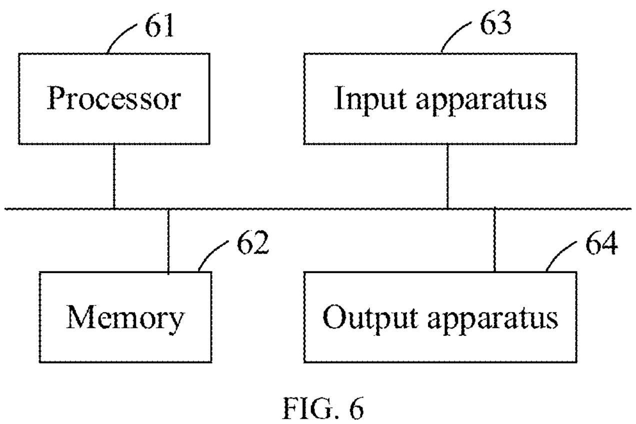
FIG. 6 is a schematic structural diagram of a video coding processing device according to some embodiments of the present disclosure.

Embodiments of the present disclosure further provide a video coding processing device. In some embodiments, the device includes the video coding processing apparatus according to some embodiments of the present disclosure. FIG. 6 is a schematic structural diagram of the video coding processing device according to some embodiments of the present disclosure. Referring to FIG. 6, the video coding processing device includes: an input apparatus 63, an output apparatus 64, a memory 62, and one or more processors 61. The memory 62 is configured for storing one or more programs; wherein the one or more programs, when loaded and run by the one or more processors 61, cause the one or more processors 61 to perform the video coding processing method according to the above embodiments. The apparatus, device, and computer described above are used to perform the video coding processing method according to any of the above embodiments, and have corresponding functions and achieve corresponding beneficial effects.

Embodiments of the present disclosure further provide a non-transitory storage medium storing one or more computer-executable instructions. The one or more computer-executable instructions, when loaded and run by a processor of a computer, cause the computer to perform the video coding processing method according to the above embodiments. The one or more computer-executable instructions in the storage medium storing the one or more computer-executable instructions provided by the present disclosure are not limited to the video coding processing method as described above, but may be used to perform related operations in the video coding processing method according to any embodiment of the present disclosure. The video coding processing apparatus and device and the storage medium according to the above embodiments are used to perform the video coding processing method according to any embodiment of the present disclosure, and for technical details not exhaustively described in the above embodiments, reference may be made to the video coding processing method according to any embodiment of the present disclosure.

In some embodiments, aspects of the methods according to the present disclosure are implemented in the form of a program product including one or more program codes. In the case that the program product is run on a computer device, the one or more program codes cause the computer device to perform the processes in the methods according to various exemplary embodiments of the present disclosure described above in the present description, e.g., the computer device performs the video coding processing method according to the embodiments of the present disclosure. The program product employs any combination of one or more readable media.

The invention claimed is:

1. A video coding processing method, comprising:
- partitioning a to-be-coded unit into a plurality of to-be-coded sub-blocks;
- determining residual proportion information of the to-be-coded unit based on residual information of each of the plurality of to-be-coded sub-blocks;
- determining whether to perform an intra sub-partition check on the to-be-coded unit based on the residual proportion information; and
- in response to a determination result of not performing the intra sub-partition check on the to-be-coded unit, performing coding processing on the to-be-coded unit based on an adjacent coded unit.

2. The method according to claim 1, wherein the residual information comprises first residual information in a first direction of the to-be-coded sub-block and second residual information in a second direction of the to-be-coded sub-block.

3. The method according to claim 1, wherein determining the residual proportion information of the to-be-coded unit based on the residual information of each of the plurality of to-be-coded sub-blocks comprises:
- determining a residual information calculation approach based on a sub-block size of the to-be-coded sub-block; and
- calculating the residual information of each of the plurality of to-be-coded sub-blocks using the residual information calculation approach and determining a maximum residual proportion of the to-be-coded unit based on the residual information.

4. The method according to claim 3, wherein determining the residual information calculation approach based on the sub-block size of the to-be-coded sub-block comprises:
- in a case that the sub-block size of the to-be-coded sub-block is within a first predetermined range, determining the residual information calculation approach of the to-be-coded sub-block as a first predetermined calculation approach, wherein each side length of a to-be-coded sub-block with a sub-block size within the first predetermined range is greater than a first predetermined value; and
- in a case that the sub-block size of the to-be-coded sub-block is within a second predetermined range, determining the residual information calculation approach of the to-be-coded sub-block as a second predetermined calculation approach, wherein a to-be-coded sub-block with a sub-block size within the second predetermined range has at least one side length equal to the first predetermined value.

5. The method according to claim 4, wherein calculating the residual information of each of the plurality of to-be-coded sub-blocks using the residual information calculation approach and determining the maximum residual proportion of the to-be-coded unit based on the residual information comprises:
- in a case that the residual information calculation approach is the first predetermined calculation approach, calculating a Hadamard transformation score of each to-be-coded sub-block and determining the maximum residual proportion of the to-be-coded unit based on a proportion of a maximum Hadamard transformation score in the Hadamard transformation scores; and
- in a case that the residual information calculation approach is the second predetermined calculation approach, calculating a sum of absolute difference of each to-be-coded sub-block and determining the maximum residual proportion of the to-be-coded unit based on a proportion of a maximum sum of absolute difference in the sums of absolute difference.

6. The method according to claim 1, wherein determining whether to perform the intra sub-partition check on the to-be-coded unit based on the residual proportion information comprises:
- in a case that the residual proportion information reaches a predetermined threshold, determining to perform the intra sub-partition check on the to-be-coded unit; and
- in a case that the residual proportion information does not reach the predetermined threshold, determining not to perform the intra sub-partition check on the to-be-coded unit.

7. The method according to claim 1, wherein the method further comprises:
- in response to a determination result of performing the intra sub-partition check on the to-be-coded unit, performing coding processing on the to-be-coded unit using an intra sub-partition technique.

8. The method according to claim 7, wherein performing coding processing on the to-be-coded unit using the intra sub-partition technique comprises:
- determining an intra sub-partition check result for the to-be-coded unit; and
- determining an intra prediction mode for the to-be-coded unit based on the intra sub-partition check result, and performing coding processing on the to-be-coded unit in the intra prediction mode.

9. The method according to claim 8, wherein determining the intra prediction mode for the to-be-coded unit based on the intra sub-partition check result comprises:
- in a case that the intra sub-partition check result satisfies an intra sub-partition processing condition, determining the intra prediction mode for the to-be-coded unit as performing coding processing on the to-be-coded unit using the intra sub-partition technique; and in a case that the intra sub-partition check result does not satisfy the intra sub-partition processing condition, determining the intra prediction mode for the to-be-coded unit as performing coding processing on the to-be-coded unit based on an adjacent coded unit.

10. A video coding processing device, comprising: a memory and one or more processors, the memory being configured for storing one or more programs;

wherein the one or more programs, when loaded and run by the one or more processors, cause the one or more processors to perform:

partitioning a to-be-coded unit into a plurality of to-be-coded sub-blocks;

determining residual proportion information of the to-be-coded unit based on residual information of each of the plurality of to-be-coded sub-blocks;

determining whether to perform an intra sub-partition check on the to-be-coded unit based on the residual proportion information; and in response to a determination result of not performing the intra sub-partition check on the to-be-coded unit, performing coding processing on the to-be-coded unit based on an adjacent coded unit.

11. A non-transitory storage medium storing one or more computer-executable instructions, wherein the one or more computer-executable instructions, when loaded and executed by a processor of a computer, cause the computer to perform:

partitioning a to-be-coded unit into a plurality of to-be-coded sub-blocks;

determining residual proportion information of the to-be-coded unit based on residual information of each of the plurality of to-be-coded sub-blocks;

determining whether to perform an intra sub-partition check on the to-be-coded unit based on the residual proportion information; and in response to a determination result of not performing the intra sub-partition check on the to-be-coded unit, performing coding processing on the to-be-coded unit based on an adjacent coded unit.

12. The device according to claim 10, wherein the residual information comprises first residual information in a first direction of the to-be-coded sub-block and second residual information in a second direction of the to-be-coded sub-block.

13. The device according to claim 10, wherein the one or more programs, when loaded and run by the one or more processors, cause the one or more processors to perform:

determining a residual information calculation approach based on a sub-block size of the to-be-coded sub-block; and calculating the residual information of each of the plurality of to-be-coded sub-blocks using the residual information calculation approach and determining a maximum residual proportion of the to-be-coded unit based on the residual information.

14. The device according to claim 13, wherein the one or more programs, when loaded and run by the one or more processors, cause the one or more processors to perform:

in a case that the sub-block size of the to-be-coded sub-block is within a first predetermined range, determining the residual information calculation approach of the to-be-coded sub-block as a first predetermined calculation approach, wherein each side length of a to-be-coded sub-block with a sub-block size within the first predetermined range is greater than a first predetermined value; and in a case that the sub-block size of the to-be-coded sub-block is within a second predetermined range, determining the residual information calculation approach of the to-be-coded sub-block as a second predetermined calculation approach, wherein a to-be-coded sub-block with a sub-block size within the second predetermined range has at least one side length equal to the first predetermined value.

15. The device according to claim 14, wherein the one or more programs, when loaded and run by the one or more processors, cause the one or more processors to perform:

in a case that the residual information calculation approach is the first predetermined calculation approach, calculating a Hadamard transformation score of each to-be-coded sub-block and determining the maximum residual proportion of the to-be-coded unit based on a proportion of a maximum Hadamard transformation score in the Hadamard transformation scores; and in a case that the residual information calculation approach is the second predetermined calculation approach, calculating a sum of absolute difference of each to-be-coded sub-block and determining the maximum residual proportion of the to-be-coded unit based on a proportion of a maximum sum of absolute difference in the sums of absolute difference.

16. The device according to claim 10, wherein the one or more programs, when loaded and run by the one or more processors, cause the one or more processors to perform:

in a case that the residual proportion information reaches a predetermined threshold, determining to perform the intra sub-partition check on the to-be-coded unit; and in a case that the residual proportion information does not reach the predetermined threshold, determining not to perform the intra sub-partition check on the to-be-coded unit.

17. The device according to claim 10, wherein the one or more programs, when loaded and run by the one or more processors, further cause the one or more processors to perform:

in response to a determination result of performing the intra sub-partition check on the to-be-coded unit, performing coding processing on the to-be-coded unit using an intra sub-partition technique.

18. The device according to claim 17, wherein the one or more programs, when loaded and run by the one or more processors, cause the one or more processors to perform:

determining an intra sub-partition check result for the to-be-coded unit; and determining an intra prediction mode for the to-be-coded unit based on the intra sub-partition check result, and performing coding processing on the to-be-coded unit in the intra prediction mode.

19. The device according to claim 18, wherein the one or more programs, when loaded and run by the one or more processors, cause the one or more processors to perform:

in a case that the intra sub-partition check result satisfies an intra sub-partition processing condition, determining the intra prediction mode for the to-be-coded unit as performing coding processing on the to-be-coded unit using the intra sub-partition technique; and in a case that the intra sub-partition check result does not satisfy the intra sub-partition processing condition, determining the intra prediction mode for the to-becoded unit as performing coding processing on the to-be-coded unit based on an adjacent coded unit.

* * * * *